(12) United States Patent
Kennicott et al.

(10) Patent No.: US 6,453,546 B1
(45) Date of Patent: Sep. 24, 2002

(54) APPARATUS AND METHOD FOR ASSEMBLING MULTI-PISTON COMPRESSORS

(75) Inventors: Thomas C. Kennicott, Centerville; Jerry A. DePoy, Bradford, both of OH (US)

(73) Assignee: Advanced Assembly Automation, Dayton, OH (US)

( * ) Notice: Subject to any disclaimer, the term of this patent is extended or adjusted under 35 U.S.C. 154(b) by 28 days.

(21) Appl. No.: 09/675,723

(22) Filed: Sep. 29, 2000

(51) Int. Cl.[7] .................................................. B23P 21/00
(52) U.S. Cl. ............................ 29/785; 29/790; 29/792; 29/822; 29/888.02; 29/464
(58) Field of Search ..................... 29/888.02, 888, 29/888.025, 429, 430, 464, 468, 469, 771, 783, 785, 787, 790, 791, 792, 795, 822; 198/575, 576, 602

(56) References Cited

U.S. PATENT DOCUMENTS

| | | | | |
|---|---|---|---|---|
| 3,973,313 A | * | 8/1976 | Hunter | |
| 4,170,289 A | * | 10/1979 | Mcdonald et al. | |
| 4,270,255 A | * | 6/1981 | Klimek | |
| 5,101,555 A | * | 4/1992 | Hauser | |
| 5,655,432 A | * | 8/1997 | Wilkosz et al. | |
| 6,038,767 A | * | 3/2000 | Ito | |

* cited by examiner

Primary Examiner—S. Thomas Hughes
Assistant Examiner—T. Nguyen
(74) Attorney, Agent, or Firm—Blackwell Sanders Peper Martin LLP

(57) ABSTRACT

An apparatus and method for assembly multi-piston pumps such as the type used in air conditioning compressors. The conveyor is used to releasably retain the required number of pistons which is then moved to an assembly station wrapping the conveyor and pistons around a swashplate which is held there in place. The conveyor retains the pistons in the appropriate circumferential and radial positions about the swashplate. The cylinder block is in partially inserted over the pistons after which the conveyor can be moved back to the loading station releasing the pistons therefrom. After the pistons are released from the conveyor and held in place by the cylinder block the pistons may then be fully inserted into the cylinder block forming a pump subassembly which may then be used to form a complete pump.

7 Claims, 6 Drawing Sheets

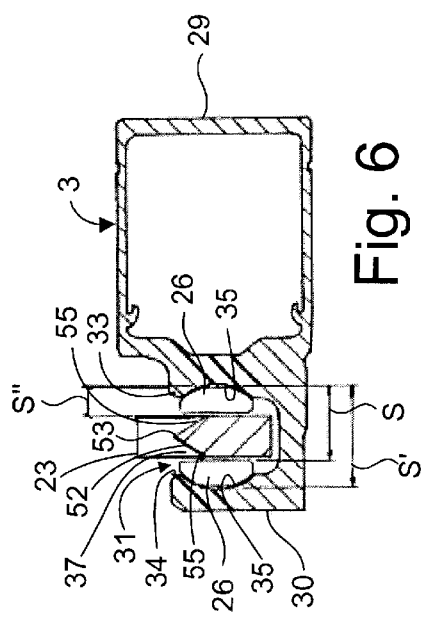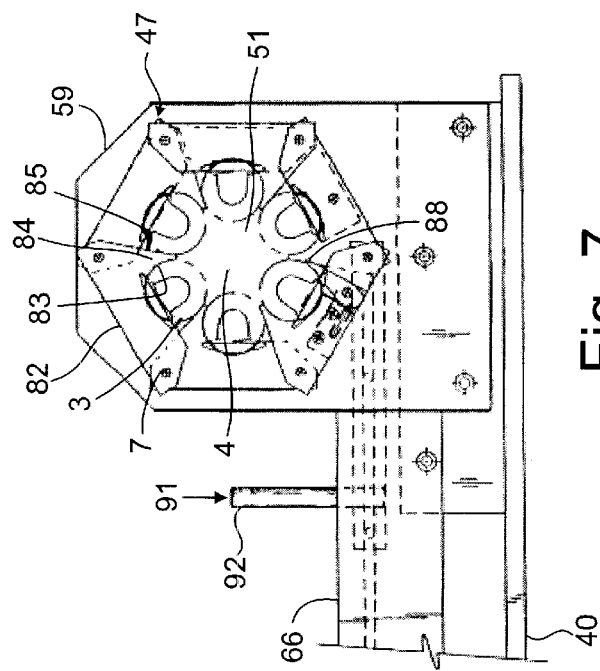

APPARATUS AND METHOD FOR ASSEMBLING MULTI-PISTON COMPRESSORS

BACKGROUND

Positive displacement pumps are used to pressurize fluid. One such pump is a multi-piston compressor utilized to pressurize gas by reciprocating movement of pistons within cylinders in a cylinder block. The cylinders are positioned in spaced relation circumferentially and also radially outwardly from the center of rotation of a piston drive. The pistons in such a pump are driven by what is referred to as a swashplate which is a plate secured to a shaft for rotation with the shaft with the plane of the plate being positioned at an angle relative to perpendicular to the axis of rotation of the shaft. The pistons are connected to the swashplate such that rotation of the swashplate will effect reciprocating motion of the pistons within the cylinders. Pivotal shoes are provided for the pistons to compensate for the change in angular relation between the swashplate and the longitudinal axis of the pistons during rotation of the swashplate. Pumps of this type can be used to pressurize both liquids and gases and are well known in the art. They are commonly used as hydraulic pumps and as air conditioning compressors.

The assembly of such pumps has been complicated because of the need to assemble the pistons into the cylinder block as a unit with the swashplate. One means of assembling such a compressor involved the use of fingers that are extended through the cylinders in the cylinder block to grip a respective piston to retain the pistons in position while pulling the pistons into the cylinders and maintaining the pistons aligned with the cylinders. The fingers are thin metal on the order of a few thousands of an inch thick. These fingers damage easily and can also damage pistons and cylinders which can lead to premature wear and failure of the pump and more importantly result in assembly apparatus downtime for repair.

In current manufacturing of air compressors, the parts are closely fit with very tight tolerances particularly at the point of engagement of piston shoes to the swashplate. Rather than custom make the components, the components are sorted into size categories. The thickness of a particular swashplate is known and its location on the automated assembly line is also known. The appropriate number of pistons is selected and gaged to determine the size of shoes needed to provide the proper fit between the shoes and the swashplate. Tolerances are sometimes maintained in the micron range for fit. The appropriately sized shoes are then installed in the pistons and the pistons with the installed shoes are then queued at a known location on the assembly line. The assembly apparatus then ensures that the appropriate piston set is assembled to the selected swashplate at an assembly station. By being gaged upstream of the assembly station, assumptions are made that both the piston set and matched swashplate arrive at the assembly station in the proper order. Further, if the assembly apparatus malfunctions, care must be taken in order to ensure the proper sequence of piston sets and swashplates are maintained to ensure subsequent proper assembly.

There is therefore a need for an improved and simplified apparatus and method for assembling multi-piston pumps.

SUMMARY OF THE INVENTION

The present invention relates to a method and apparatus for assembling multi-piston pumps that utilize a swashplate to effect reciprocating linear motion of the pistons in the cylinders. The apparatus includes a conveyor that is operable to receive and transport pistons while retained in cradles. Shoes are fitted in sockets in the pistons and retained in the sockets during movement to an assembly station. At the assembly station, the pistons are positioned circumferentially about the swashplate and retained in their respective positions in the conveyor by retainers. When at the assembly station the shoes are retained in their respective sockets by the swashplate. A drive is provided to move the conveyor and the pistons to the assembly station and once the pistons are placed in cylinders in a cylinder block the drive will retract the conveyor from its compressor assembly location to its fill location.

The method involves placing a plurality of pistons in cradles along a conveyor. The pistons have grooves at the bottom end (swashplate end) with sockets on opposite sides of the groove facing toward one another for the receipt of shoes in the sockets. A gap is maintained between the shoes that is slightly larger than the thickness of the swashplate. The gap dimension is held to very close tolerance. A swashplate is mounted at an assembly station with the swashplate being in line with the gaps between the shoes. The conveyor is wrapped around the swashplate with the swashplate being received in the gaps between the shoes. The pistons are positioned at predetermined locations both circumferentially around the swashplate and radially from the center of rotation of the swashplate so that they are in line with the cylinders in a cylinder block. After the pistons are in position, the cylinder block is moved to the pistons with the pistons each being simultaneously inserted into a respective cylinder. The conveyor is then retracted and separated from the pistons after which the pistons are each fully inserted into their respective cylinder and the swashplate shaft is inserted into a bearing for rotation relative to the cylinder block.

The present invention also relates to a method of assembling pumps by gaging the various components at the assembly station to thereby eliminate the need for tracking the various matched components through the assembly machine. Gaging at the assembly station simplifies the construction and operation of the apparatus as well as its repair and maintenance during down times.

Other objects and features will be in part apparent and in part pointed out hereinafter.

BRIEF DESCRIPTION OF THE DRAWINGS

FIG. 6 is an enlarged view of a piston with portions broken away to show details of shoes mounted in the piston.

FIG. 7 is an enlarged front elevation view of the assembly station.

Corresponding reference characters indicate corresponding parts throughout the several views of the drawings.

DETAILED DESCRIPTION

Figure 1:
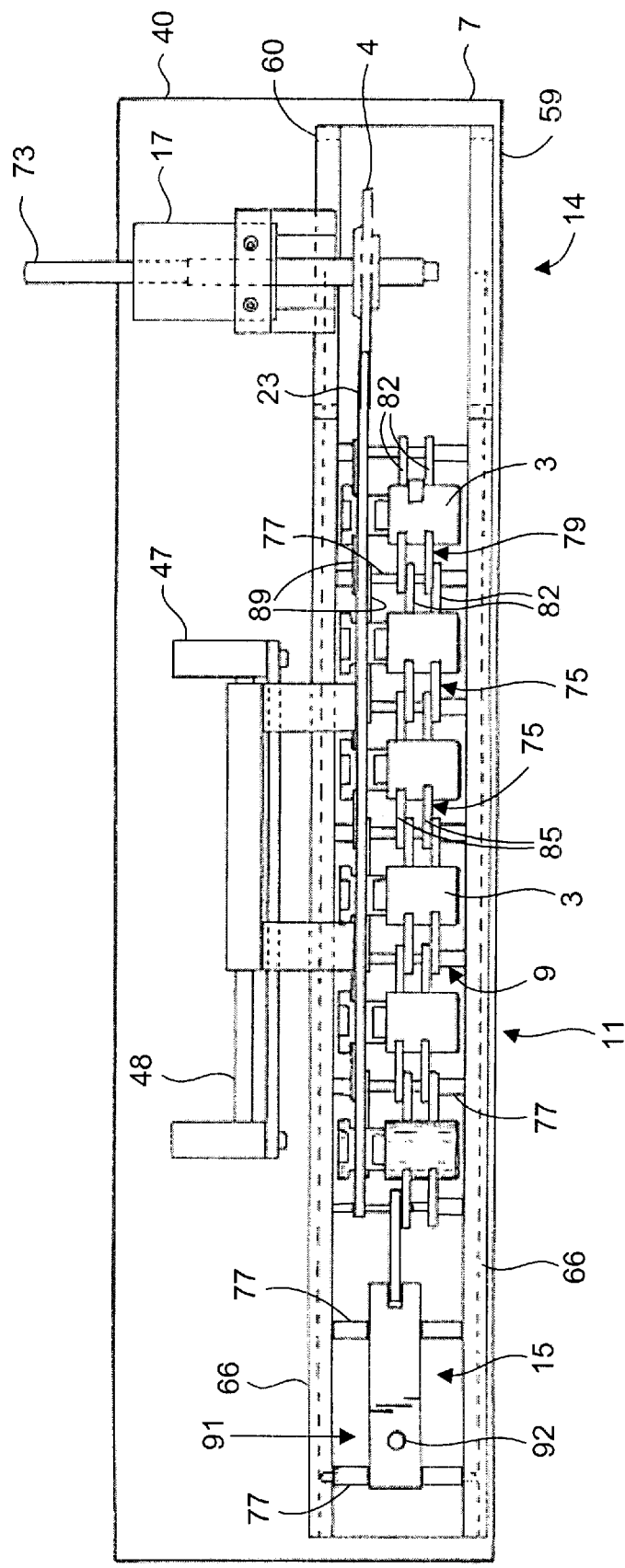
FIG. 1 is a plan view of an apparatus for assembling pistons on a swashplate for insertion into a cylinder block.

FIG. 1 illustrates an apparatus 1 designed generally for making an assembly of pistons 3, swashplate 4 and cylinder block 5 in the formation of a positive displacement pump such as a compressor used in air conditioning. The basic components of the apparatus 1 includes a frame support 7 with a conveyor 9 mounted thereon. The conveyor 9, while in a loading station 11, is adapted to receive and selectively retain a plurality of pistons 3 each in a respective cradle 12. The conveyor 9 is selectively movable into and out of an assembly station 14 by a drive 15. A mount 17 is provided for mounting a swashplate assembly 19 which includes the swashplate 4 mounted on a shaft 21. The plane of the swashplate 4 is generally in line with the piston guide bar 23 such that a gap 25, which gap is maintained by the guide during movement of the pistons 3 to the assembly station 14, between a pair of shoes 26 within a piston 3 is in line with swashplate 4. The conveyor 9 moves the pistons around the swashplate 4 when the swashplate is mounted in the assembly station 14 to position the pistons 3 retained in the conveyor 9 around the swashplate 4 and retaining the pistons each in a respective predetermined radial and circumferential position. When retained in positions around the swashplate 4 the pistons 3 are in line with cylinders 28 in the cylinder block 5. With the pistons 3 held in position on the swashplate 4 in the correct positions for insertion into the cylinder block 5, the cylinder block is moved over the top ends 29 of the pistons 3 with each piston being inserted into a respective cylinder 28. After all pistons 3 are started into their respective cylinder 28 the conveyor 9 may be moved back to its loading position rotating the cylinder block 5 and revaluing the pistons 3 therein about the central axis of the swashplate 4. After disengagement from the conveyor 9, the pistons may be fully inserted into their respective cylinders 28 by further axial movement of the cylinder block 5. The assembled pistons, swashplate, shaft and cylinder block may then be removed from the assembly station 14 as a subassembly and transported for further assembly into a complete compressor.

As best seen in FIG. 6, a piston 3 comprises a top end 29 (compression end) which is received in the cylinder 28, which, during reciprocating motion in the cylinder, pressurizes the fluid in the cylinder 28 as desired. On the down stroke of the piston 3, the pressure of the fluid within the cylinder 28 is reduced. The lower end 30 (drive end) of the piston 3 includes a notch 31 which is generally perpendicular to the longitudinal axis of the piston 3 and is generally U shaped. The notch opens sideways to the movement of the piston 3 within its cylinder 28. The notch 31 is defined on two sides (top 33 and bottom 34) by generally oppositely facing surfaces each surface having a recessed socket 35 therein with the sockets in each piston 3 opening toward one another. The sockets 35 each have a generally spherical surface comprising a portion of a sphere. A shoe 26 is inserted into each of the sockets 35 with each shoe having a surface matching the generally spherical socket surface and a generally flat surface for engagement with the swashplate. When installed in a piston 3, the shoes have a gap 37 therebetween into which the swashplate 4 is inserted with one shoe engaging one side of the swashplate and the other shoe engaging the other side of the swashplate. Depending on the angle of the swashplate relative to the axis of the drive shaft 21 which in air conditioning compressors is a variable angle, the length of the stroke of the pistons within the cylinders can be varied providing a variable stroke (and thus variable displacement) and compression ratio. Pumps of the general type disclosed herein are well known in the art and can be used to both pump liquids and gases (thru pressurization of the fluid) and are used for such things as air compressors, air conditioning compressors, hydraulic pumps and the like. The pump also includes a cylinder block 5 having a plurality of cylinders 28 therein, each cylinder containing a respective piston 3. Generally the cylinders 28 are equally spaced circumferentially around the cylinder block and are radially equally spaced from the center of rotation of the swashplate (FIG. 7). For compressors used for air conditioning, a typical piston 3 is on the order 1 inch to 1½ inches in diameter. The pump is ported and valved in a cylinder head (not shown) for appropriate ingress and egress of fluid into and out of each of the cylinders as required for the particular application. The cylinder block may also contain a bearing for rotatably mounting the shaft 21 of the swashplate assembly 19. A pump base (not shown) is secured to the lower end of the cylinder head for rotatably carrying the opposite end of the swashplate shaft and other components of the pump.

Figure 2:
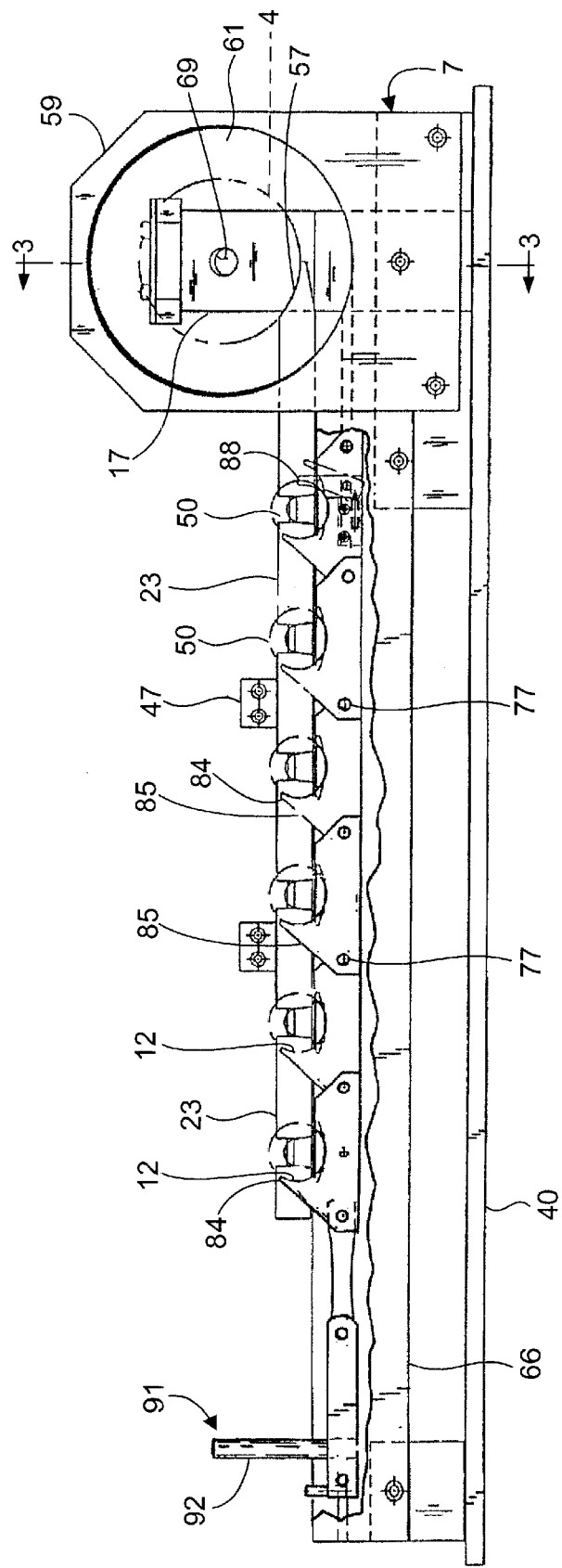
FIG. 2 is a front elevation view of the apparatus, with portions broken away to show details of the conveyor and swashplate shown in phantom.

The frame 7 is comprised of a base plate 40 having a pair of spaced apart support rails 66 each with an inwardly facing groove 65 for receiving therein portions of the conveyor chain. The guide bar 23 is mounted on the frame and is operable for selective positioning between the shoes 26 in each of the pistons 3. In the illustrated embodiment the guide 23 is mounted for movement on a slide bracket 47 for movement toward and away from the assembly station 14. The slide bracket 47 is also upwardly pivotable about a guide rod 48 to facilitate loading of pistons 3 on the conveyor 9. When the shoes 26 are inserted into each of the sockets 35 of each of the pistons 3 the guide 23 is in down position with a notch 50 aligned with each of the pairs of sockets in each piston. The guide rail, when down, retains the shoes in their respective sockets. As best seen in FIG. 2, the guide rail has a plurality of spaced apart notches 50 along its length. The notches 50 are recessed from the top edge of the guide rail and terminate approximately midway between the top and bottom of the sockets 35 in the pistons 3. The bottom of the notch 50 is formed by a double bevel 52 with the edge between the two beveled surfaces 53 being approximately midway between the opposite sides of the guide rail FIG. 6. The full thickness of the guide rail 23 is positioned adjacent the lower portions of the sockets. When the guide rail 23 is in its retracted position in the loading station (FIG. 2), the notches 50 are aligned with the sockets 35 allowing the installation of the shoes 26 into each of the sockets 35. It is preferred that the confluence between the side surfaces of the guide rail and the respective beveled surface be radiused as at 55 to provide the necessary clearance for the insertion of the shoes 26 into the sockets 35. The provision of the bevels and radio permits easy installation of the shoes 26 into the sockets 35 while firmly retaining the shoes 26 within the sockets 35 once installed. Prior to moving the pistons 3 into the assembly station 14, the guide 23 is moved forward from its retracted position (in the loading station 11) where a curved end edge is positioned immediately adjacent to the outer perimeter of the swashplate 4 to provide reliable installation of the pistons 3 and shoes 26 onto the swashplate 4. After assembly of the pistons 3 onto the swashplate 4, the guide 23 may be retracted from the forward position at the assembly station 14 allowing it to be pivoted upwardly and out of the way for easy insertion of a subsequent set of pistons 3 onto the conveyor 9 as described below. The lowered end 57 of the guide 23 is contoured to coincide with the outer perimeter of the swashplate to prevent shoe loss during transition of the pistons from the guide to the swashplate (FIG. 2).

Figure 4:
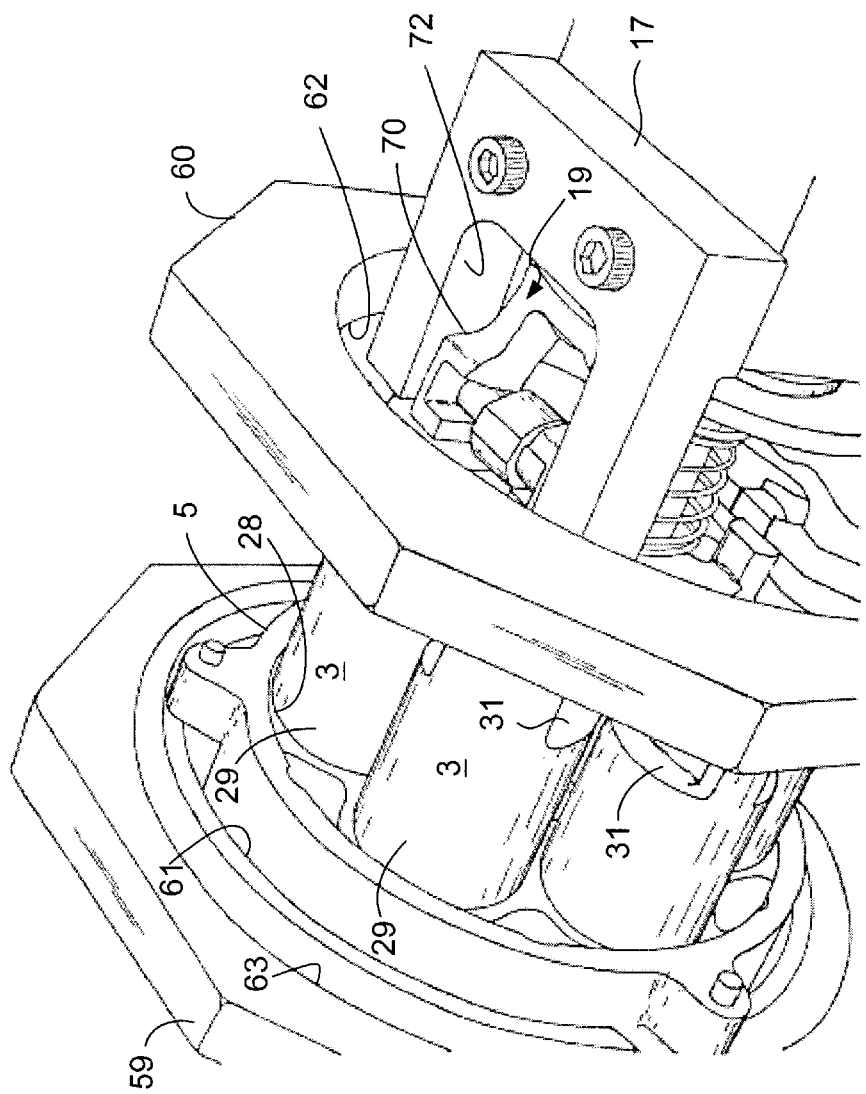
FIG. 4 is an enlarged fragmentary perspective view of the assembly station showing the pistons in position and partially inserted into a cylinder block.
Figure 5:
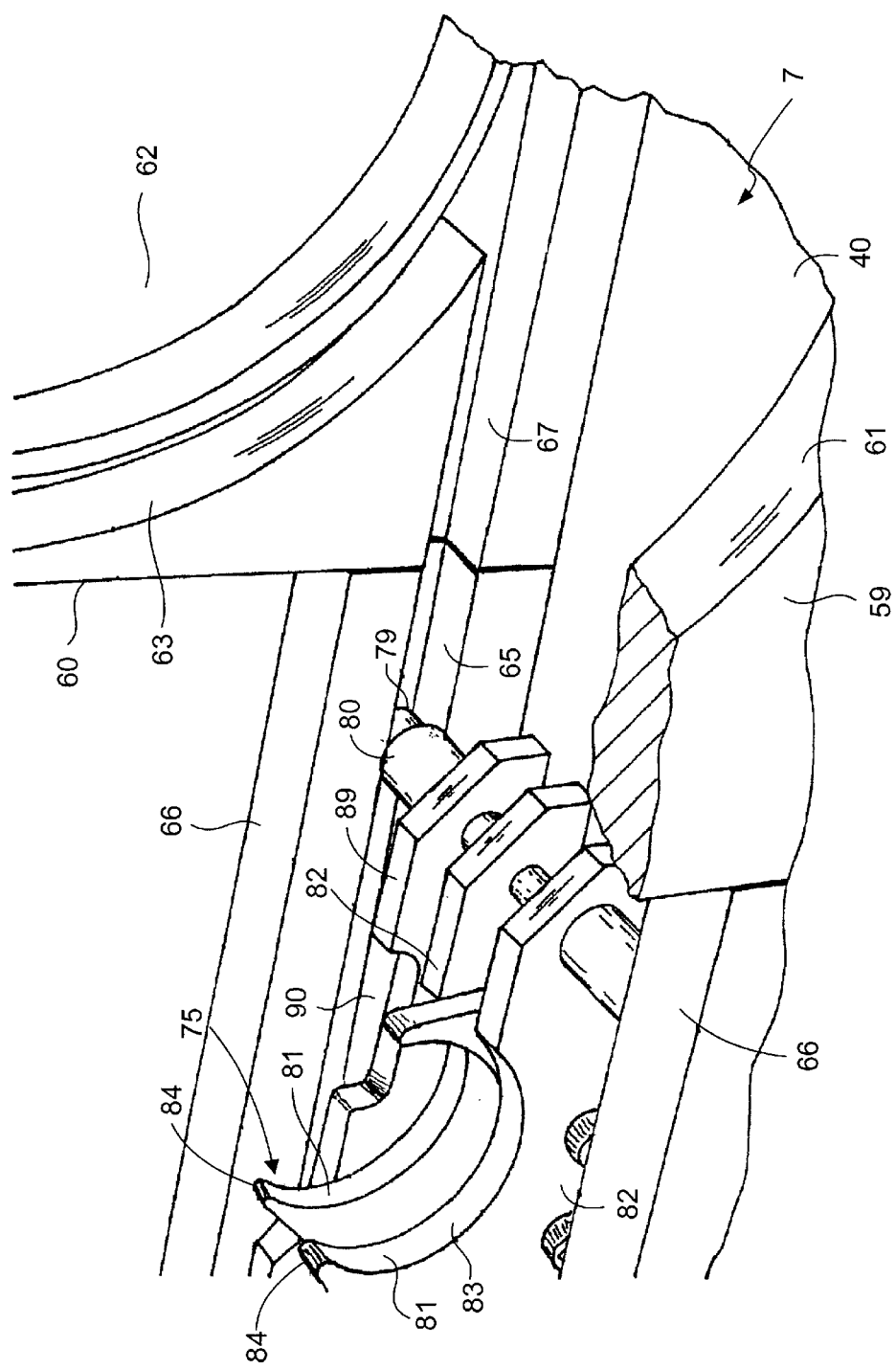
FIG. 5 is an enlarged fragmentary view of a portion of the conveyor illustrating certain details of the leading cradle and the assembly station.

As shown in FIGS. 4 and 5, the assembly station 14 includes a pair of spaced apart brackets 59, 60 each having an opening 61, 62 respectively with a surrounding circular groove 63 recessed in the inside surface of each bracket. On one side of the conveyor 9, the opening 61 provides access to the pistons 3 for the insertion of the cylinder block 5 onto the pistons. On the opposite side of the conveyor 9, the opening in the bracket allows for insertion of the shaft 21 of the swashplate assembly 19 into the mount 17 secured to the base plate 40. The circular grooves 63 each open into a respective conveyor groove 65 recessed in the inside surface of a respective support rail 66 via an intermediate groove section 67 forming continuous conveyor guide grooves.

As seen in FIGS. 1, 2 and 4, the swashplate is mounted on the mount 17 by having its shaft received in a bore 69 in the mount 17. For the assembly of the pistons 3 around the swashplate 4, the swashplate and shaft 21 need not rotate in the mount. As shown in FIG. 4, an ear 70 projecting from the shaft 21 is received in a notch 72 to prevent rotation of the swashplate in the assembly station 14. A pin 73 may be provided in the mount 17 extending into the bore 69 from the backside for pushing the swashplate shaft 21 out of the mount.

Figure 3:
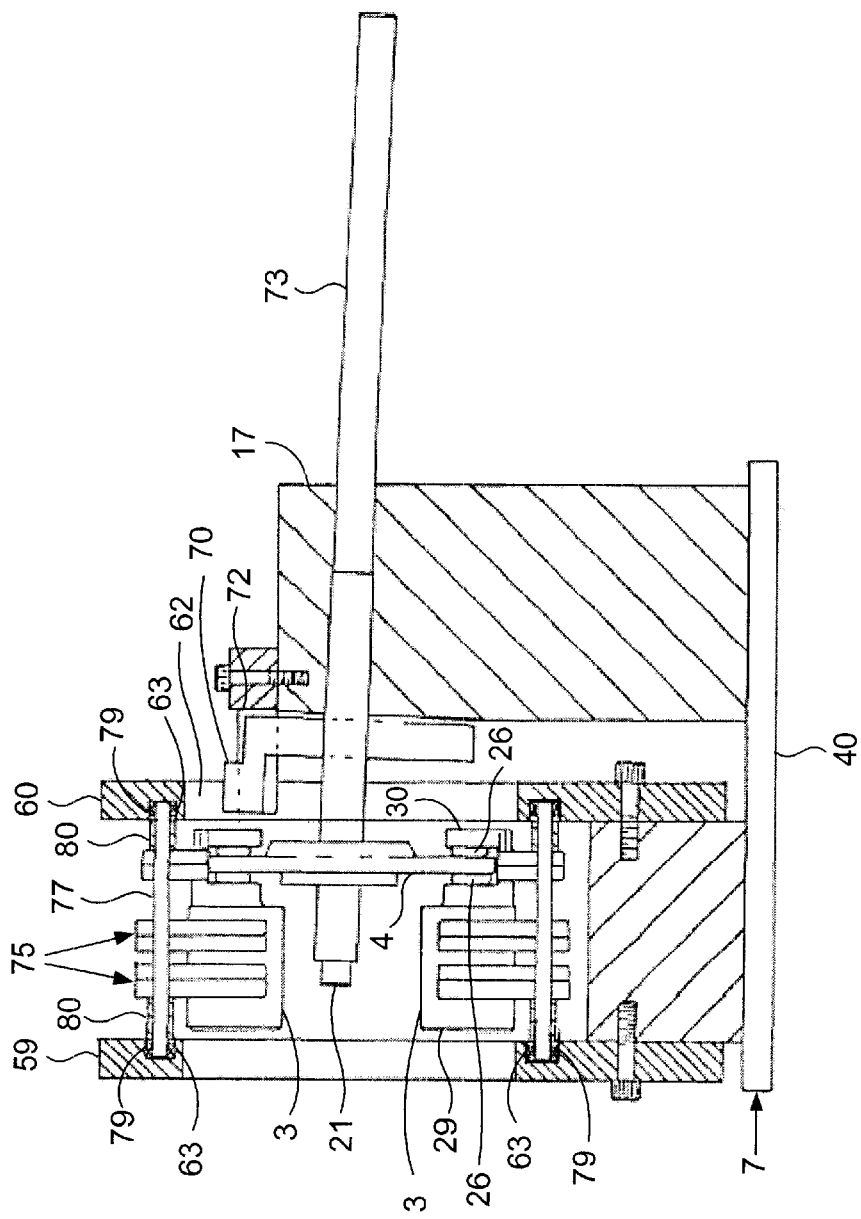
FIG. 3 is an end elevation sectional view of the assembly apparatus.

The conveyor 9 is comprised of a series of interconnected link assemblies 75 that extend longitudinally along the conveyor 9 joined and supported by transverse support bars 77 that have opposite ends received in the elongate grooves of the support rails (FIGS. 1, 3 and 5). The grooves 65 in the support rails 66 are contiguous with the grooves 63 and 67 in the brackets 59 and 60 forming continuous guide grooves to guide the transverse bars in the loading station 11 and in a curved track around the swashplate 4 in the assembly station to wrap the conveyor 9 with the contained pistons 3 around the swashplate 4. Bearings 79 are mounted on the ends of the bars 77 to ride in the grooves 63, 65 and 67 to reduce friction during movement of the conveyor, FIG. 5. Collars 80 are provided on each end of the bars 77 to limit lateral movement of the bars. The circular grooves 63 maintain the conveyor 9 and pistons 3 in a circle around the swashplate 4 and maintain a tight fit between the pistons and the swashplate around the swashplate in the correct radial position (spacing from the axis of the shaft 21) for mounting the cylinder block 5 on the pistons.

The conveyor 9 is provided with retaining or (gripping) members that are operable to lock the pistons in their cradles when wrapping the conveyor 9 and the carried pistons 3 around the swashplate. As shown, each conveyor link assembly 75 comprises two cradle sections 81 spaced apart transversely. Each cradle section 81 includes plates 82 mounted to the transverse bars 77 and having a radiused surface 83 sized to snuggly fit the outer diameter of the pistons, FIG. 5. A finger 84 projects upwardly from the plate 82 whereby the arc length of each radiused surface 83 is less than 180 degrees of the circumference of the pistons for easy insertion of the pistons into the cradle 81. Each of the fingers has a trailing edge 85 adjacent to a trailing cradle 81, FIGS. 2 and 7. When the conveyor 9 wraps around the swashplate 4, the fingers 84 point generally radially inwardly and will engage the outer surface of the trailing piston 3 to lock the trailing piston in its cradles 81. This is best seen in FIG. 7. The fingers 84 are of size and position such that when in engagement with a trailing piston about 240 degrees of arc length of piston circumference is within the cradles 81 and leading fingers 84 firmly retaining the pistons in their cradles. It is preferred that the plates 82 be of a non-marring but relatively rigid polymeric material such as PTFE (polytetraflouroethylene) or soft metal like aluminum alloy.

Since the leading cradles 81 on the conveyor 9 do not follow another cradle 8 having fingers 84, a separate pivoting finger 88 is provided for locking the leading piston into its cradles, FIG. 5. Finger 88 is pivoted on one or both of the plates 82 and is held in a resilient gripping engagement with a piston by a spring loaded plunger (not shown). The plunger biases the finger 88 to its closed position to engage a piston in the cradles 81. The link assemblies 75 are also each provided with a support link 89 adjacent the rear support rail 66. The links 89 are each provided with upwardly opening of notches 90 sized and shaped to receive a lower end portion of a piston 3 therein, FIGS. 1 and 5. The links 89 support the lower ends of the pistons in the loading station 11 and during movement to the assembly station.

A drive 91 is provided to effect movement of the conveyor from the loading station 11 into the assembly 14 station and then back out. This can be done either manually or with a power drive. In the illustrated embodiment, the drive 91 is manual and is accomplished by an operator gripping a handle 92 at the trailing end of the conveyor 9 pushing the conveyor 9 and contained pistons into the assembly station 14 around the swashplate 4. After initial assembly of the cylinder block 5 onto the pistons 2, the conveyor is withdrawn from the assembly station 14. Because the fingers 84 are on the trailing side of the pistons and the pistons revolve around the swashplate axis, they easily release from the pistons on the return stroke allowing the conveyor 9 to move back to the loading station.

The structure of the present invention is better understood by a description of the operation thereof. The conveyor 9 is initially at the loading station 11. A piston 3 is placed in each cradle 81 with its notch 31 opening upwardly. A pair of shoes 26 is placed in the sockets 35 of each piston with the guide 23 in the notches. The guide 23 retains the shoes 26 in their sockets 35 until the swashplate 4 captures them in their sockets. A swashplate assembly 19 is then placed in the mount by having shaft 21 inserted into the bore 69. The swashplate 4 is aligned with the guide 23 by engagement with the mount 17 to ensure that the gaps 37 between the shoes 26 will align with the swashplate 4. The conveyor 9 is then advanced into the assembly station 14 wrapping the pistons 3 around the swashplate 4 with the shoes 26 in each piston being on opposite sides of the swashplate 4. During wrapping, the fingers 84 of the leading cradles 81 move into engagement with the piston in the following (trailing) cradles 81 to lock the piston 3 within its cradles. The leading piston 3 on the conveyor 9 is locked into its leading cradle with the finger 88. With the conveyor 9 wrapped around the swashplate 4, the pistons 3 are held both in their circumferential positions about the swashplate 4 as well as in their radial position out from the center of the swashplate shaft 21. The operator then installs the cylinder block 5 onto the top ends 29 of the pistons 3 ensuring that all the pistons are started into their respective cylinder 28 of the cylinder block. Initially the pistons 3 are inserted into the cylinders a distance of approximately ¼ to ½ inches. To facilitate assembly, it is preferred that the plane of the swashplate 4 be generally perpendicular to the longitudinal axis of the swashplate shaft 21 for assembly with the pistons. It has been found that an angle of up to about 2 degrees from perpendicular is acceptable. After the cylinder block 5 is started onto the pistons 3, the conveyor 9 can then be retracted into the loading station 11 moving the pistons and the cylinder block 5 about the longitudinal axis of the shaft 21. In the illustrated embodiment, the swashplate 14 does not rotate when the conveyor 9 is moved back to the loading station 11 and the pistons are held in place by the cylinder block 5. Once the pistons 3 are separated from the conveyor 9 the pistons may be fully inserted into the cylinder block 5 by further axial movement of the cylinder block onto the pistons. The shaft 21 is also inserted into a bearing in the cylinder block 5. After the cylinder block 5 is assembled onto the pistons 3, the subassembly including the cylinder block, pistons and swashplate assembly may be removed from the assembly station 14. The pin 73 may be used to facilitate removal of the subassembly from the assembly station 14. After removal from the assembly station 14 the remainder of the parts needed to complete the pump can then be attached.

The thickness of the swashplate is gaged preferably before mounting in the assembly station 14. The sockets 35 in each piston 3 are gaged to determine their spacing, for example, the dimension S or S' as seen in FIG. 6. For example, the distance between the bottoms of both sockets may be gaged (S). A reference area may also be the inside surface of a shoe with the other reference area for gaging being the bottom of the opposite socket (S'). The sockets are gaged either by having one shoe in place or neither shoes in place. From this measurement, the required shoe size (S") can be calculated to provide the desired fit to the swashplate. Once the desired shoe size is determined, the operator can insert the appropriately sized shoe into the socket by selecting the appropriate shoe from shoes presorted by size. By selecting the parts at the assembly station and because there is no guessing on an apparatus which simultaneously queues more than one set of parts, there is no need to keep track of the location of a set of pistons and swashplate as is currently done in automated manufacturing processes. This simplifies the equipment required for the assembly of a pump and also reduces the cost of equipment necessary to assemble pumps.

In view of the above, it will be seen that the several objects of the invention are achieved and other advantageous results attained.

As various changes could be made in the above construction without departing from the scope of the invention, it is intended that all matter contained in the above description and shown in the accompanying drawings shall be interpreted as illustrative and not in a limiting sense.

What is claimed is:

1. Apparatus for assembling a compressor utilizing a swashplate to effect movement of a plurality of pistons in respective cylinders comprising a conveyor operable to receive and hold a plurality of compressor pistons;

a guide rail adjacent the conveyor operable to receive a pair of shoes, one on each side of the rail, and retain said shoes each in a respective socket in a respective piston, said conveyor and rail cooperating to allow movement of the pistons and shoes while retaining the shoes in the sockets;

an assembly station operable to releasably retain a swashplate assembly therein, said swashplate assembly having a swashplate generally in line with said guide rail whereby a gap between the shoes in each piston is in line with the swashplate;

a plurality of cradles positioned along the conveyor with the cradles each adapted for releasably holding a respective piston; and a drive operable to selectively move the conveyor such that the pistons are positioned around the swashplate at predetermined positions and holding said pistons each at a respective said position.

2. An apparatus as set forth in claim 1 including track for supporting and guiding said conveyor as the conveyor moves around a swashplate in the assembly station.

3. An apparatus as set forth in claim 2 including retaining means adjacent the cradles and operable for retaining pistons in the cradles at least during movement of the cradles in the assembly station.

4. An apparatus as set forth in claim 3 wherein said retaining means is operable to grip the pistons while in the cradles in an assembly station.

5. An apparatus as set forth in claim 3 wherein the retaining means includes a finger carried by the conveyor and positioned adjacent a respective trailing cradle whereby when the conveyor moves in the assembly station the fingers point generally radially inwardly.

6. An apparatus as set forth in claim 5 wherein the fingers have portions that move circumferentially closer to and engage a piston in a trailing cradle to retain a piston in the trailing cradle during movement around the assembly station.

7. An apparatus as set forth in the claim 1 including a mount at the assembly station for rotatably mounting a swashplate at the assembly station with said mount fixing the plane of the swashplate generally parallel to the direction of movement of the conveyor.

* * * * *

UNITED STATES PATENT AND TRADEMARK OFFICE
CERTIFICATE OF CORRECTION

PATENT NO.    : 6,453,546 B1
DATED         : September 24, 2002
INVENTOR(S)   : Kennicott et al.

It is certified that error appears in the above-identified patent and that said Letters Patent is hereby corrected as shown below:

Column 3,
Line 32, delete "revaluing" and replace with -- revolving --;

Column 4,
Line 51, delete "radio" and replace with -- radii --.

Signed and Sealed this

Eleventh Day of February, 2003

JAMES E. ROGAN
*Director of the United States Patent and Trademark Office*